(12) United States Patent
Galvin et al.

(10) Patent No.: US 10,239,087 B2
(45) Date of Patent: Mar. 26, 2019

(54) MULTI-BEAD APPLICATOR

(71) Applicant: ADCO Products, LLC, Michigan Center, MI (US)

(72) Inventors: James Galvin, Cleveland, OH (US); David L. Kunkle, Chelsea, MI (US); James D. Haaser, Lancaster, OH (US); Paul E. Snowwhite, Dexter, MI (US); Ronald Vollmer, Chelsea, MI (US); Karl Johnson, Willoughby Hills, OH (US); Sean Uncapher, Jackson, MI (US); Justin Bates, Clarklane, MI (US)

(73) Assignee: ADCO Products, LLC, Michigan Center, MI (US)

( * ) Notice: Subject to any disclaimer, the term of this patent is extended or adjusted under 35 U.S.C. 154(b) by 0 days.

(21) Appl. No.: 15/444,586

(22) Filed: Feb. 28, 2017

(65) Prior Publication Data

US 2017/0165705 A1   Jun. 15, 2017

Related U.S. Application Data

(63) Continuation-in-part of application No. 13/143,294, filed as application No. PCT/US2011/024898 on Feb. 15, 2011, now Pat. No. 9,610,604.
(Continued)

(51) Int. Cl.
*B67D 3/00* (2006.01)
*B05B 13/00* (2006.01)
(Continued)

(52) U.S. Cl.
CPC ............ *B05C 5/0279* (2013.01); *B05B 9/007* (2013.01); *B05B 13/005* (2013.01);
(Continued)

(58) Field of Classification Search
CPC ............ B05B 13/005; B05C 17/00589; B05C 17/00576; B05C 17/00553; B05C 5/0279;
(Continued)

(56) References Cited

U.S. PATENT DOCUMENTS

| 4,252,274 A * | 2/1981 | Kubacak | ................. E01H 11/00 239/163 |
| 4,535,919 A * | 8/1985 | Jameson | ............... B05B 7/0025 137/467.5 |

(Continued)

*Primary Examiner* — Dah-Wei D. Yuan
*Assistant Examiner* — Stephen A Kitt
(74) *Attorney, Agent, or Firm* — Kirsten Stone; Daniel J. Barta

(57) ABSTRACT

A system for applying a two-part adhesive to a substrate includes two separate trays for holding a 15 gallon capacity drum containing a two-part adhesive compound, where the trays are tiltable independent of each other, a prime mover for providing an output torque, a first pump connected to the prime mover for receiving the output torque, the first pump having an inlet and an outlet, a second pump connected to the prime mover for receiving the output torque, the second pump having an inlet and an outlet, a first compound in communication with the inlet of the first pump, a second compound in communication with the inlet of the second pump, a first accumulator in communication with the outlet of the first pump, a second accumulator in communication with the outlet of the second pump, a first manifold in communication with the outlet of the first pump, and a second manifold in communication with the outlet of the second pump. A plurality of applicators is included.

17 Claims, 17 Drawing Sheets

Related U.S. Application Data

(60) Provisional application No. 61/305,893, filed on Feb. 18, 2010.

(51) Int. Cl.

| | | |
|---|---|---|
| *B05C 17/005* | (2006.01) | |
| *B05B 9/00* | (2006.01) | |
| *B05C 5/02* | (2006.01) | |
| *B62B 3/00* | (2006.01) | |
| *B05C 11/10* | (2006.01) | |
| *E04D 15/00* | (2006.01) | |
| *E04D 15/07* | (2006.01) | |

(52) U.S. Cl.
CPC ...... *B05C 11/1036* (2013.01); *B05C 11/1044* (2013.01); *B05C 17/00553* (2013.01); *B05C 17/00589* (2013.01); *B62B 3/005* (2013.01); *B67D 3/0019* (2013.01); *E04D 15/00* (2013.01); *E04D 15/07* (2013.01)

(58) Field of Classification Search
CPC ................ B01F 13/0042; B67D 3/0019; B41J 2/175–2/17559
See application file for complete search history.

(56) References Cited

U.S. PATENT DOCUMENTS

| | | | | |
|---|---|---|---|---|
| 4,789,100 A | * | 12/1988 | Senf | B01F 13/0042 222/134 |
| 5,390,825 A | * | 2/1995 | Rockel | C10M 105/38 222/135 |
| 2002/0063760 A1 | * | 5/2002 | Dietl | B41J 2/17546 347/86 |
| 2008/0123466 A1 | * | 5/2008 | Thompson | B01F 11/0042 366/275 |

\* cited by examiner

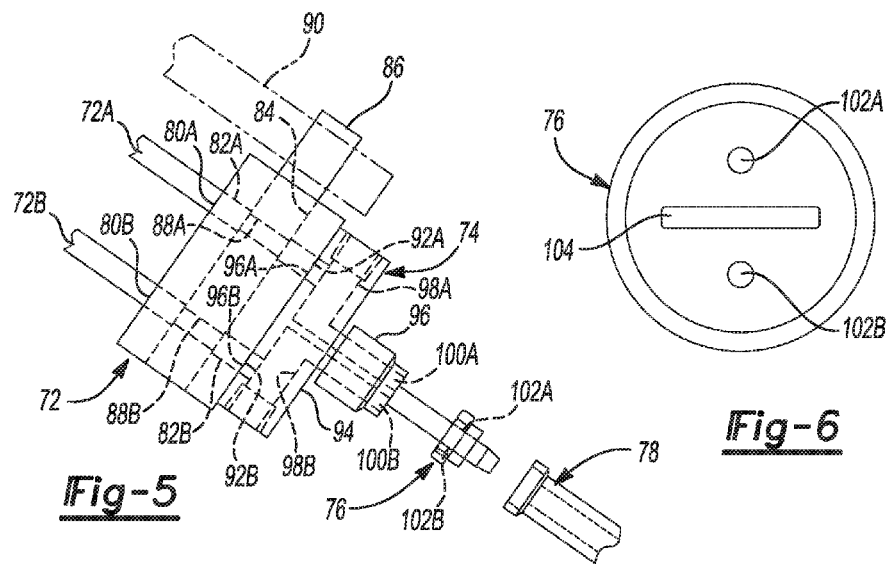
Fig-5
Fig-6
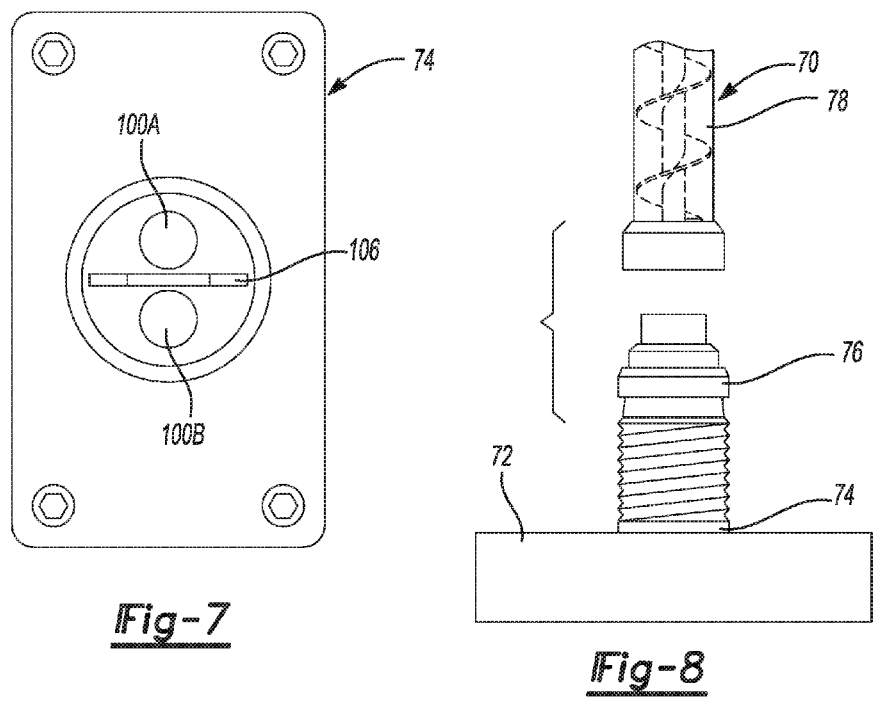
Fig-7
Fig-8

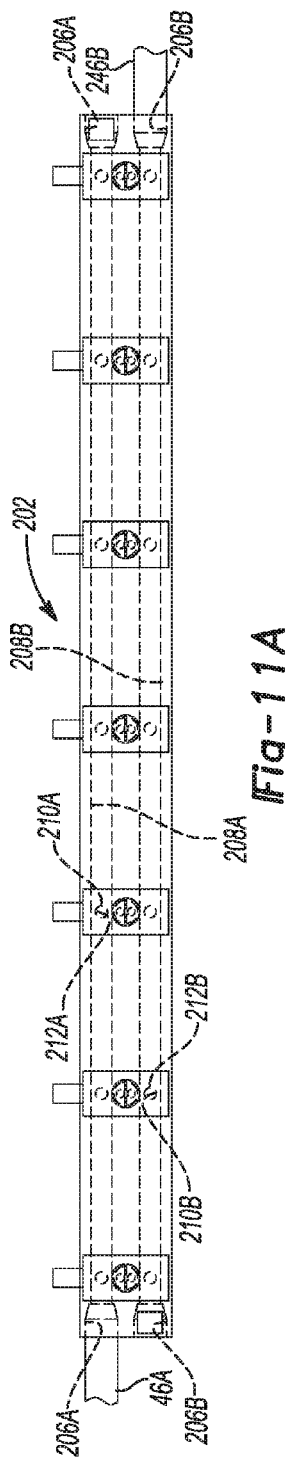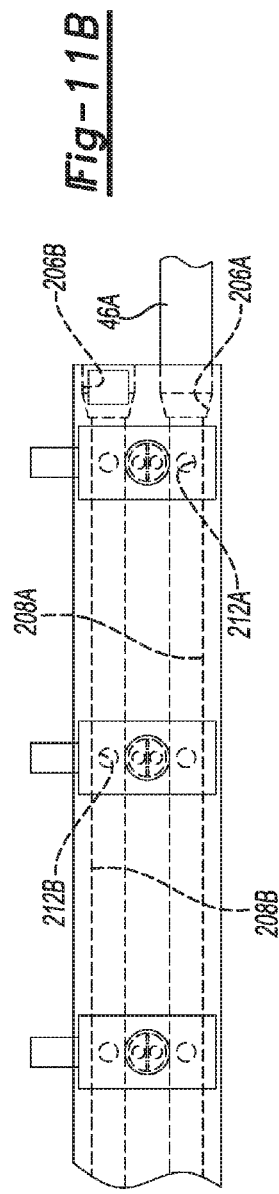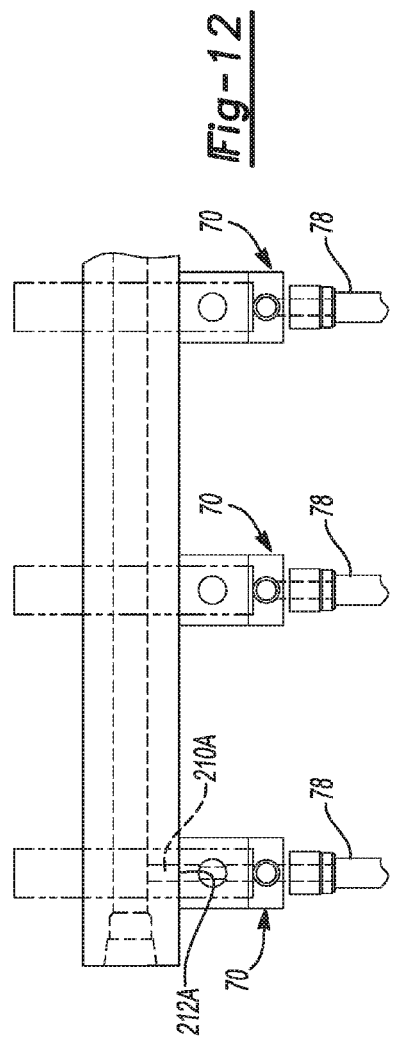

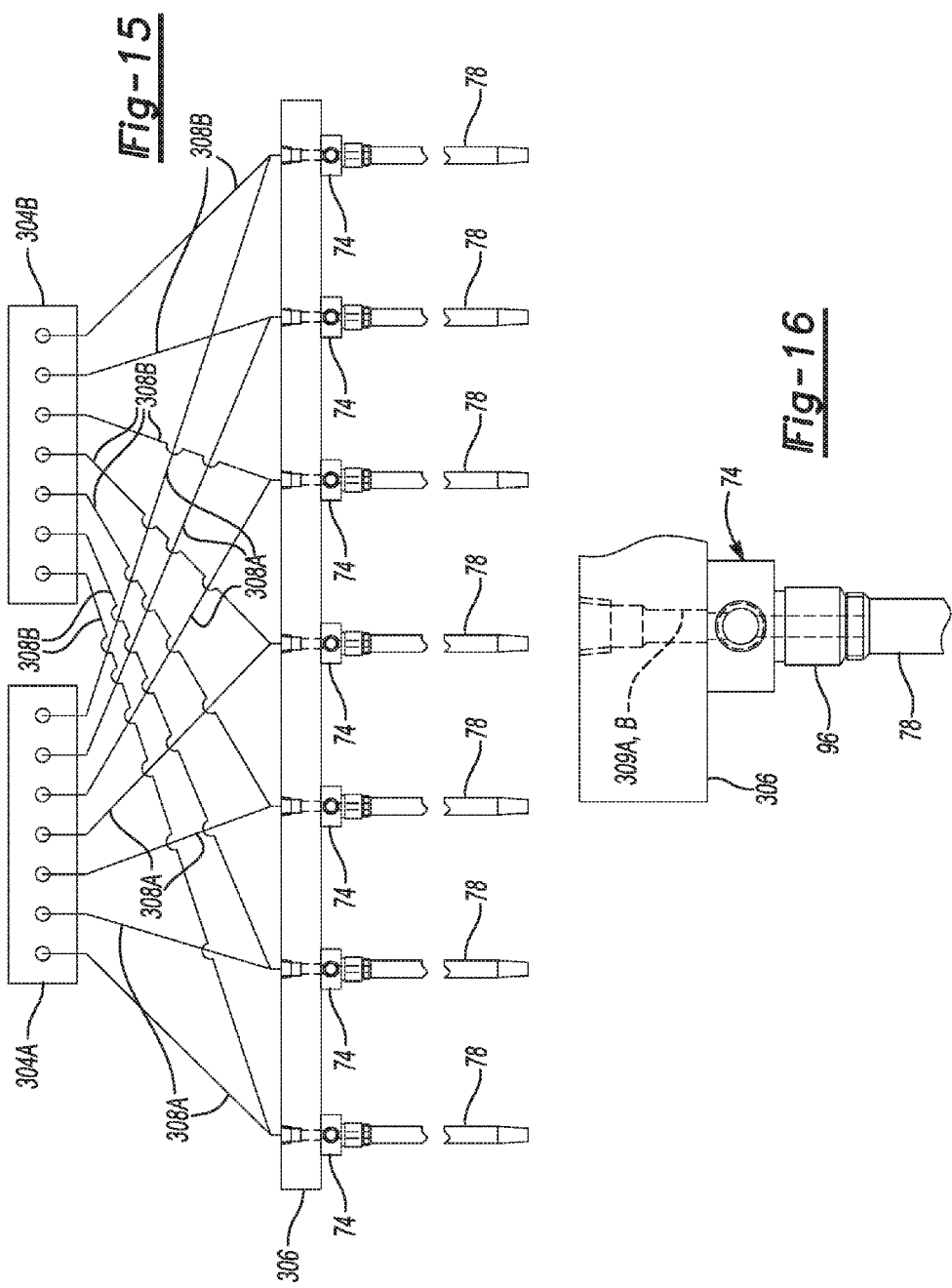

MULTI-BEAD APPLICATOR

CROSS-REFERENCE TO RELATED APPLICATIONS

This application is a continuation-in-part of U.S. application Ser. No. 13/143,294 filed Jul. 5, 2011, which is a National Stage U.S. Application No. PCT/US11/24898 filed Feb. 15, 2011, and which claims priority to U.S. Provisional Application No. 61/305,893 filed Feb. 18, 2010. The disclosure of the above applications are incorporated herein by reference.

FIELD

The present invention relates to an applicator system for dispensing an all-weather adhesive on a roofing substrate, and more particularly to an applicator with tiltable trays for dispensing an all-weather two-part foamable adhesive having polyol on a roofing substrate.

BACKGROUND

In many roofing applications, for example in large, flat commercial roof decks, a roofing membrane is used to seal and protect the roof deck from environmental weather conditions. The roofing membrane may be made of various materials, such as polymeric materials including EPDM (ethylene propylene diene M-rubber) or TPO (thermoplastic polyolefin). The roofing membrane is adhered overtop insulation boards or panels. The insulation boards are typically secured to the roofing substrate or roof deck via an adhesive composition. A conventional adhesive composition used to adhere the insulation boards to the roof deck includes polyurethane. The polyurethane adhesives are oftentimes applied directly onto the roof deck via an applicator system and the insulation boards are then laid onto the roof deck surface. Conventional polyurethane adhesives oftentimes include two separate parts that are mixed by an applicator just prior to being applied onto the surface of the roof deck. The two parts include an isocyanate blend and a simple polyol blend. Upon mixing, the isocyanate blend reacts or crosslinks with the simple polyol blend to form the polyurethane adhesive.

However, these conventional two-part polyurethane adhesives are sensitive to weather conditions due to the effects of temperature on the viscosity, and therefore the reaction speed, of the adhesive. Accordingly, conventional two-part polyurethane adhesives are packaged and formulated into various grades, such as Summer, Winter, and Regular, that vary the composition of the adhesive in order to account for temperature.

One solution to the problem of temperature effects on conventional two-part polyurethane adhesives is to use a high-viscosity adhesive. However, the applicator systems that are currently used to apply the adhesives to the roofing substrate are pump driven and oftentimes are unable to reliably pump high-viscosity two-part polyurethane adhesives. Also, the current applicator systems does not always allow an operator to safely load or unload large and/or heavy containers housing the two part adhesives, and are difficult to maneuver or stage on job sites. Therefore, there is room in the art for a pump driven applicator system that reliably pumps high viscosity adhesives, can hold larger containers of adhesive components and yet will allow an operator to always safely load or unload the containers.

SUMMARY

A pump driven applicator system is provided. The system for applying a two-part adhesive to a substrate includes a carrier, at least two pair of wheels coupled to the carrier, at least two trays that can both tilt independent of each other and hold at least a 15 gallon capacity container or drum each, a prime mover mounted on the carrier for providing a driving torque, a pumping system having inlets and outlets and driven by the prime mover and an applicator, the applicator having a first inlet, a second inlet and an outlet, wherein the applicator is configured to mix the first compound with the second compound to form the two-part adhesive and the two-part adhesive is discharged from the outlet of the applicator onto a substrate that is substantially parallel.

DRAWING DESCRIPTION

FIG. 5 is a side view of a manifold used with the device;

FIG. 6 is a front view of a connector used with the device;

FIG. 7 is a front view of another connector used with the device;

FIG. 8 is an exploded side view of the connectors shown in FIGS. 6 and 7 with a removable wand;

FIG. 11A is front view of a manifold used with the device;

FIG. 11B is a front view of a portion of the manifold shown in FIG. 11A;

FIG. 12 is a top view of connectors used with the device;

FIG. 15 is a connection diagram of the device;

FIG. 16 is a partial view of a connection of the device;

DETAILED DESCRIPTION

The following description is merely exemplary in nature and is not intended to limit the present disclosure, application, or uses.

Figure 1:
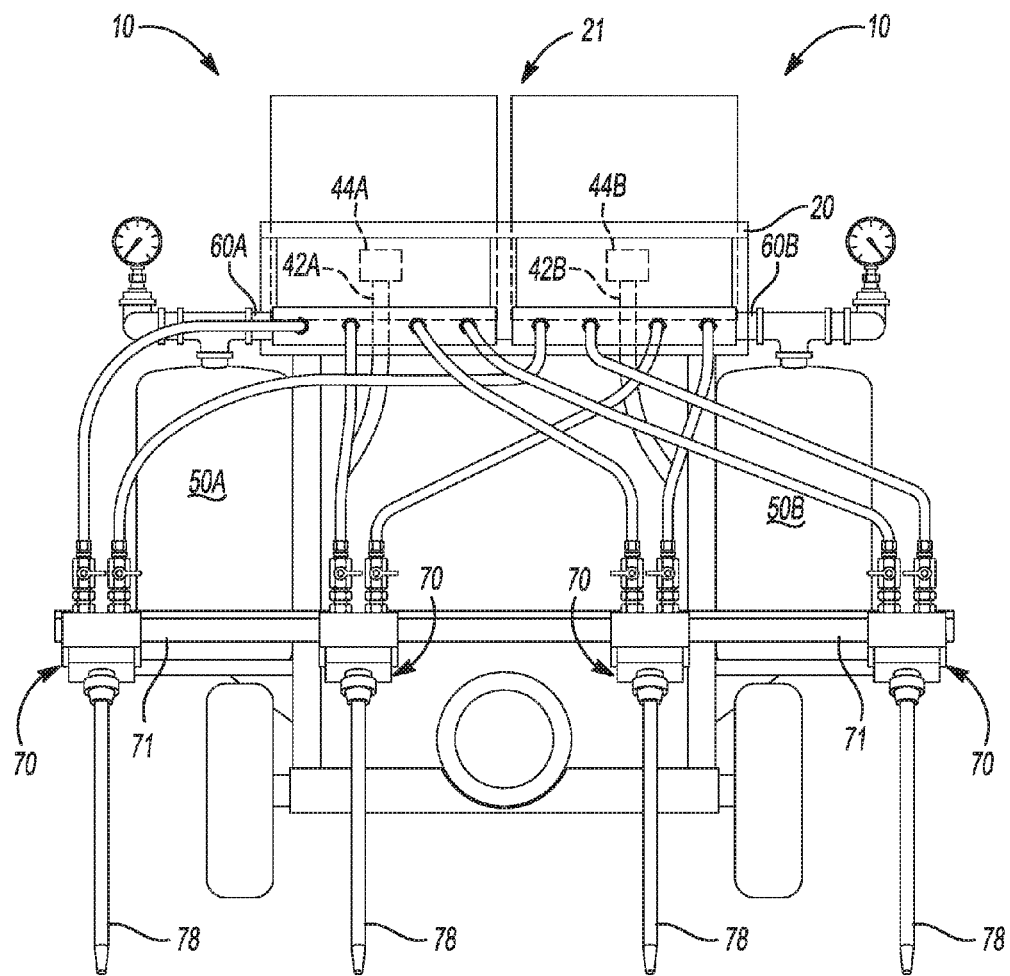
FIG. 1 is a front view of a device for applying a two-part adhesive.
Figure 2:
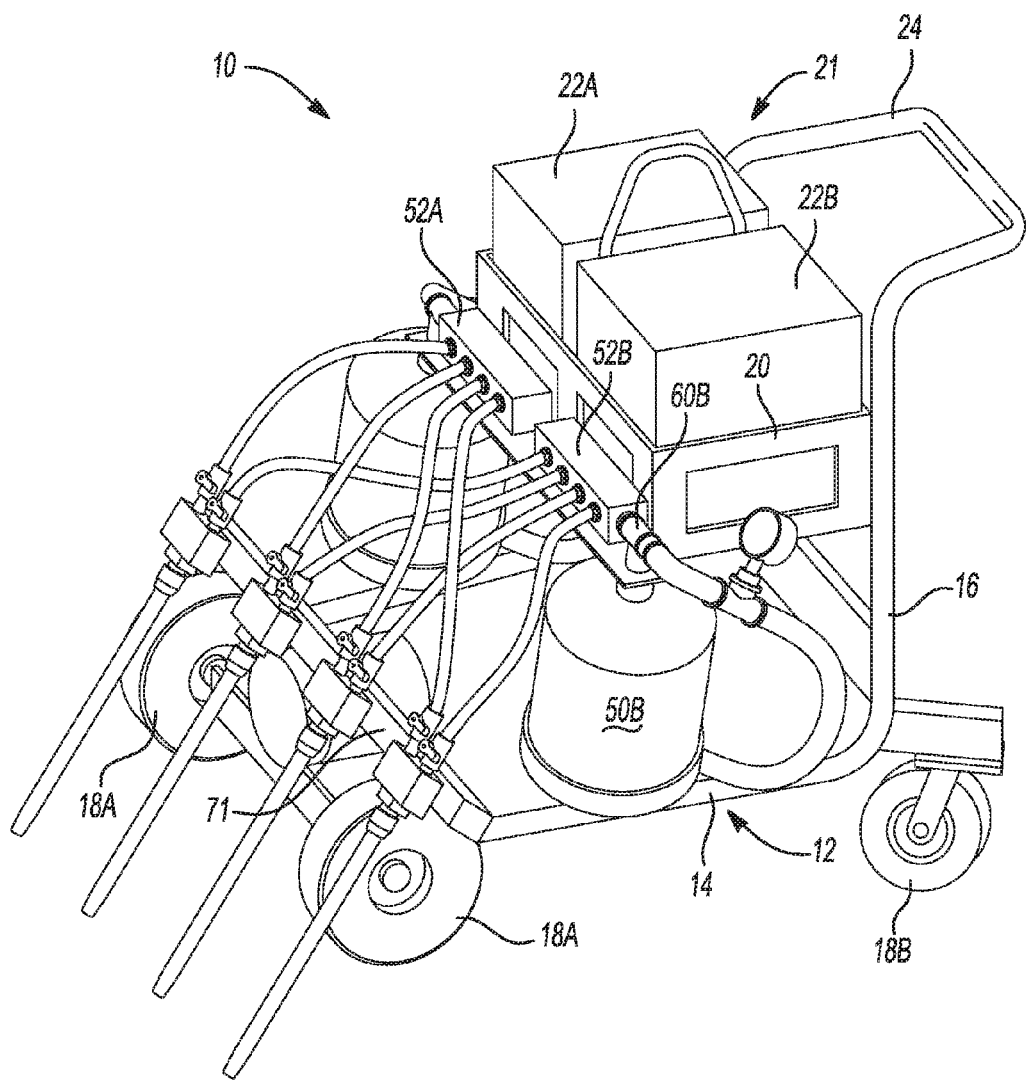
FIG. 2 is a front perspective view of the device.

Referring to FIGS. 1 and 2, a device for applying a two-part fluid to a substrate is generally indicated by reference number 10. The device 10 includes a carrier or frame 12. The carrier or frame 12 is used to support the various components of the device 10 and may take many forms without departing from the scope of the present invention. In the example provided, the carrier 12 includes a rectangular base 14 with an upwardly extending portions or support columns 16. The rectangular portion includes two rotatable front wheels 18A and two spindle mounted back wheels 18B. Back wheels 18B are pivotable and rotatable allowing the device 10 to move forward as well as turn and rotate. The portion 16 supports an upper frame 20. The upper frame 20 is sized to receive two parts of a two-part compound 21. These two parts are packaged separately and include an "A" side package 22A and a "B" side package 22B. Each of the packages preferably contain one part of a two part all weather polyurethane adhesive for use on roofing substrates. The upper frame 20 is designed to accommodate a particular package configuration of the A side 22A and the B side 22B. While in the example provided the A side 22A and B side 22B are illustrated as having a rectangular box packaging system, it should be appreciated that other shaped packaging systems may be supported by the upper frame 20. A handle portion 24 extends out from the upper frame 20 or alternatively from the portion 16 of the frame 12.

Figure 3:
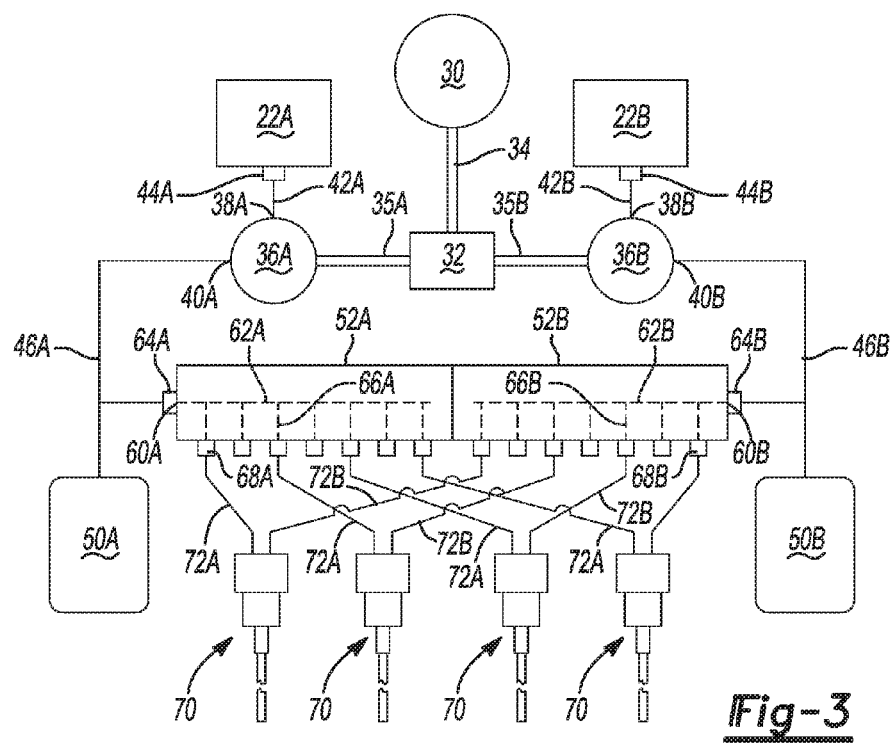
FIG. 3 is a schematic diagram of the device.
Figure 4:
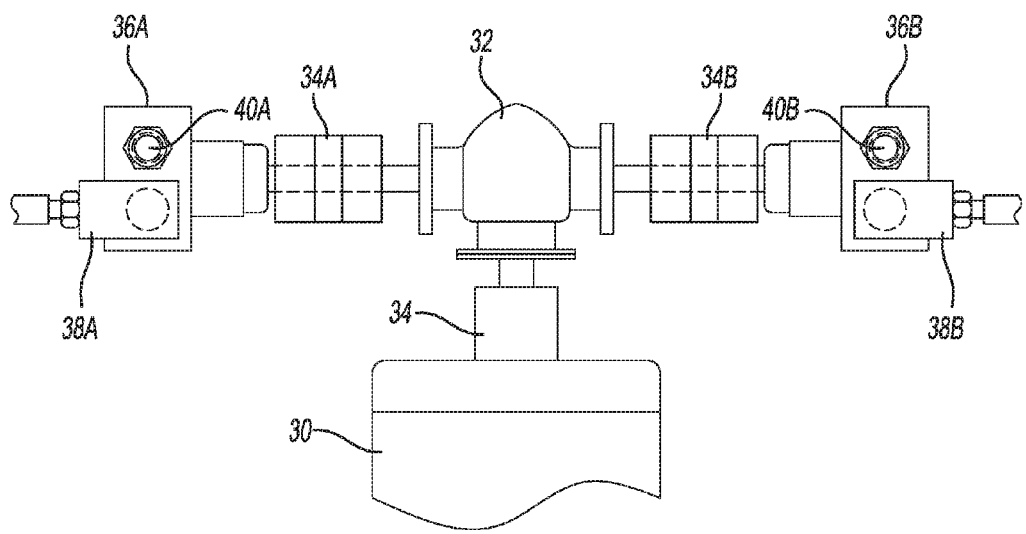
FIG. 4 is a view of a portion of the device showing a prime mover and gear box connection.

Turning to FIGS. 3 and 4, the device 10 includes a prime mover 30 fixed or otherwise connected to the carrier 12. The prime mover 30 is preferably an electric motor, though it should be appreciated that the prime mover 30 may be any type of engine, such as a combustion engine, without departing from the scope of the present invention. The prime mover 30 is connected to a gear box 32 via a rotatable shaft 34. The gear box 32 is fixed or otherwise connected to the carrier 12. The gearbox 32 transfers torque from the prime mover 30 to first and second rotatable shafts 34A and 34B which in turn are coupled to a first and second pump 36A and 36B, respectively. This physical separation of the pumps 36A and 36B by the gear box 32 helps to prevent a possible mixing of the adhesives within the pumps and helps to prolong the life of the applicator system. It will be appreciated by skilled persons in the art that the applicator system may also exclude a gear box 32 and instead be replaced with a dual shaft motor to separate the first 36A and second pump 36B and a variable frequency drive. Each pump 36A and 36B includes an inlet 38A and 38B, respectively, and an outlet 40A and 40B, respectively. In addition, the prime mover 30 may be connected to the wheels 18B or 18A to provide a self-propelled configuration for the device 10 controlled by a throttle (not shown).

Returning to FIGS. 1 and 2, and with reference to FIGS. 3 through 8, the inlet 38A is connected via a hose or other fluid passage 42A to the A side package 22A of the two-part compound 21. In the example provided, the hose 42A is connected to a quarter turn connector 44A located on a bottom of the A side package 22A. However, it should be appreciated that various other connection devices may be employed. The connector 44A extends through an opening in the bottom of the upper frame 20. Likewise, the inlet 38B is connected via a hose or other fluid passage 42B to the B side package 22B of the two-part compound 21. In the example provided, the hose 42B is connected to a quarter turn connector 44B located on a bottom of the B side package 22B. However, it should be appreciated that various other connection devices may be employed. The connector 44B extends through an opening in the bottom of the upper frame 20. The connectors 44A, 44B may be keyed connectors such that the connector 44A can only connect to the hose 42A and the connector 44B can only connect to the hose 44B, thereby preventing switching the A and B packages 22A, 22B on the device 10.

The outlet 40A of the pump 36A is connected via hose or other type of fluid passage 46A to an accumulator 50A and a manifold 52A. The accumulator 50A is an energy storage device in which a non-compressible fluid is held under pressure by an external source. In the example provided, the accumulator 50A is a gas filled type accumulator having a compressible gas that acts on a bladder within the accumulator to provide a compressive force on fluid within the accumulator 50A. However, it should be appreciated that the accumulator 50A may be of other types, such as a spring type, without departing from the scope of the present invention.

The manifold 52A is attached to a front of the upper frame 20. The manifold 52A includes an inlet port 60A that connects with the hose 46A. In one embodiment, the manifold 52A includes an inlet port 60A that communicates with a bore 62A that extends through the manifold 52A. A ball valve 64A is preferably disposed within the inlet port 60A and connects the hose 46A with the bore 62A. The bore 62A communicates with a plurality of perpendicularly extending side bores 66A. The side bores 66A each communicate with an outlet port 68A on the manifold 52A. In the example provided, there are seven side bores 66A and seven outlet ports 68A. However, it should be appreciated that any number of side bores 66A and outlet ports 68A may be employed without departing from the scope of the present invention.

Each of the outlet ports 68A may be optionally connected to one of a plurality of applicator units 70 via hoses or other fluid passages 72A. In the example provided, four applicator units 70 are illustrated with four hoses 72A connecting each of the applicator units 70 with one of the outlet ports 68A. However, it should be appreciated that the manifold 52A can accommodate up to seven applicator units 70. The manifold 52A allows each applicator unit 70 to receive a flow of "A" side fluid from the "A" side package 22A.

The outlet 40B of the pump 36B is connected via hose or other type of fluid passage 46B to an accumulator 50B and a manifold 52B. The accumulator 50B is an energy storage device in which a non-compressible fluid is held under pressure by an external source. In the example provided, the accumulator 50B is a gas filled bladder type accumulator having a compressible gas that provides a compressive force on fluid via the bladder within the accumulator 50B. However, it should be appreciated that the accumulator 50B may be of other types, such as a spring type, without departing from the scope of the present invention.

The manifold 52B is attached to a front of the frame 20. The manifold 52B includes an inlet port 60B that connects with the hose 46B. In one embodiment, the manifold 52B includes an inlet port 60B that communicates with a bore 62B that extends through the manifold 52B. A ball valve 64B is preferably disposed within the inlet port 60B and connects the hose 46B with the bore 62B. The bore 62B communicates with a plurality of perpendicularly extending side bores 66B. The side bores 66B each communicate with an outlet port 68B on the manifold 52B. In the example provided, there are seven side bores 66B and seven outlet ports 68B. However, it should be appreciated that any number of side bores 66B and outlet ports 68B may be employed without departing from the scope of the present invention.

Each of the outlet ports 68B may be optionally connected to one of a plurality of the applicator units 70 via hoses or other fluid passages 72B. In the example provided, the four applicator units 70 are illustrated with four hoses 72B connecting each of the applicator units 70 with one of the outlet ports 68B. However, it should be appreciated that the manifold 52B can accommodate up to up to seven applicator units 70. The manifold 52B allows each applicator unit 70 to receive a flow of "B" side fluid from the "B" side package 22B. separately from the fluid from the "A" side package 22A.

With specific reference to FIGS. 1, 2 and 5, the applicator units 70 are mounted on a front beam 71 attached to the carrier 12 and each applicator unit 70 includes a rotary valve 72, a dual manifold 74, an orifice restrictor 76, and a nozzle 78. As illustrated in FIG. 5, the rotary valve 72 includes an inlet port 80A and an inlet port 80B. The inlet port 80A is connected with the hose 72A to receive "A" side fluid and the inlet port 80B is connected with the hose 72B to receive "B" side fluid. The inlet port 80A communicates with a bore 82A and the inlet port 80B communicates with a bore 82B. The bores 82A and 82B are separate and do not communicate with one another. Each bore 82A and 82B extend through the rotary valve 72 parallel to one another. A shaft bore 84 is located in the rotary valve and perpendicularly intersects both the bores 82A and 82B. A rotatable shaft 86 is disposed within the shaft bore 84. The rotatable shaft 86 includes two spaced apart holes 88A and 88B that extend through the diameter of the shaft 86. The spaced apart holes 88A and 88B are in alignment with the bores 82A and 82B, respectively. The shaft 86 is connected to a lever 90. Alternatively, the shaft 86 may be connected via a rigid or wire connection to a lever or other device connected with the handle 24 of the carrier 12. By rotating the shaft 86, the holes 88A and 88B are simultaneously moved in and out of alignment with the bores 82A and 82B. Accordingly, the rotary valve 72 is operable to throttle the fluid flow of the "A" and "B" side fluids through the applicator unit 70. The rotary valve 72 further includes bolt channel outlet ports 92A and 92B that communicate with the bores 82A and 82B, respectively.

With specific reference to FIGS. 5, 6 and 7, the dual manifold 74 includes a body portion 94 and a neck portion 96 that extends out from the body portion 94. The dual manifold 74 includes inlet ports 96A and 96B that are connected to the bolt outlet ports 92A and 92B, respectively, of the rotary valve 72. The inlet ports 96A and 96B communicate with separate channels or bores 98A and 98B, respectively, that communicate through the body portion 94 and into the neck portion 96 to outlet ports 100A and 100B, respectively.

The orifice restrictor 76 is sealingly engaged to the neck portion 96 of the dual manifold 74. The orifice restrictor 76 includes a first orifice 102A and a second orifice 102B that communicate with the outlet ports 100A and 100B, respectively. The orifices 102A and 102B are separate and do not communicate with each other. In the example provided, the orifice restrictor 76 includes a slot 104 sized to receive a tab member 106 located on the neck portion 96 of the dual manifold 74, as shown in FIGS. 6 and 7. The tab member 106 assures that the first orifice 102A and the second orifice 102B do not communicate. The first orifice 102A has a diameter different than the second orifice 102B. For example, the first orifice 102A has a diameter that is a function of the material characteristics of the composition of the "A" side fluid. The second orifice 102B has a diameter that is a function of the material characteristics of the composition of the "B" side fluid. The orifices 102A and 102B assure that fluid does not backflow into the dual manifold 74, as will be described below. The orifices 102A, 102B allow high viscosity compound to be ported therethrough. Combined with the configuration of the pumps 36A and 36B, the device 10 is operable to pump compounds having viscosities higher than 2500 Pas, and preferably as high as about 7000 Pas.

Turning to FIG. 8, the nozzle 78 is an extended member that mixes the "A" side fluid with the "B" side fluid. The nozzle 78 is coupled to the orifice restrictor 76 and communicates with the orifices 102A and 102B. The nozzle 78 is disposable and is preferably a 36 element mixing nozzle, though it should be appreciated that other types and grades of nozzles may be employed without departing from the scope of the present invention. Once the fluids from the "A" and "B" sides are mixed, the combined fluid exits in the nozzle 78 and is dispensed in the form of elongated beads on the roofing substrate.

With combined reference to FIGS. 1-8, the operation of the device 10 will now be described. An operator of the device 10 activates the prime mover 30 which in turn drives the pumps 36A and 36B. The pumps 36A and 36B suck fluid from the "A" and "B" side packages 22A and 22B via hoses 42A and 42B, respectively. The "A" side fluid exits the pump 36A via outlet port 40A and enters the hose 46A. An amount of "A" side fluid enters the accumulator 50A and charges the accumulator 50A. In the example provided, the accumulator 50A preferably stores the fluid at approximately 300 psi. The remaining "A" side fluid enters the manifold 52A and is communicated through the central bore 62A to the side bores 66A. The "A" side fluid then exits the manifold 52A and communicates via hose 72A to the rotary valve 74 of the applicator unit 70. The "A" side fluid communicates through the rotary valve 74 and is throttled based on the rotational position of the shaft 86. The "A" side fluid exits the rotary valve 74, communicates through the dual manifold 76 and the orifice restrictor 76 and enters the nozzle 78 for mixing.

Likewise, "B" side fluid exits the pump 36B via outlet port 40B and enters the hose 46B. An amount of "B" side fluid enters the accumulator 50B and charges the accumulator 50B. In the example provided, the accumulator 50B preferably stores the fluid at approximately 300 psi. The remaining "B" side fluid enters the manifold 52B and is communicated through the central bore 62B to the side bores 66B. The "B" side fluid then exits the manifold 52B and communicates via hose 72B to the rotary valve 74 of the applicator unit 70. The "B" side fluid communicates through the rotary valve 74 and is throttled based on the rotational position of the shaft 86. The "B" side fluid exits the rotary valve 74, communicates through the dual manifold 76 and the orifice restrictor 76 and enters the nozzle 78 for mixing with the "A" side fluid. The mixed adhesive is then dispensed from the nozzle 78 onto a substrate. By widening the distance between nozzles 78 or the number of nozzles 78, areas may be covered exceeding 40 inches in width.

While the orifice restrictor 76 and the nozzle 78 are disposable, it is desirable that the dual manifold 74 and rotary valve 76 do not become clogged with mixed and cured fluid. However, once the device 10 is deactivated, mixed fluid within the nozzle 78 may cure and expand, forcing mixed fluid back towards the orifice restrictor 76. However, as the pumps 36A and 36B are deactivated, the accumulators 50A and 50B begin to discharge, providing a positive pressure of fluid back towards the orifice restrictor 76. The back pressure provided by the accumulators 50A and 50B, in conjunction with the sizes of the orifices 102A and 102B, prevent mixed material within the nozzle 78 from entering the dual manifold 74.

Figure 9:
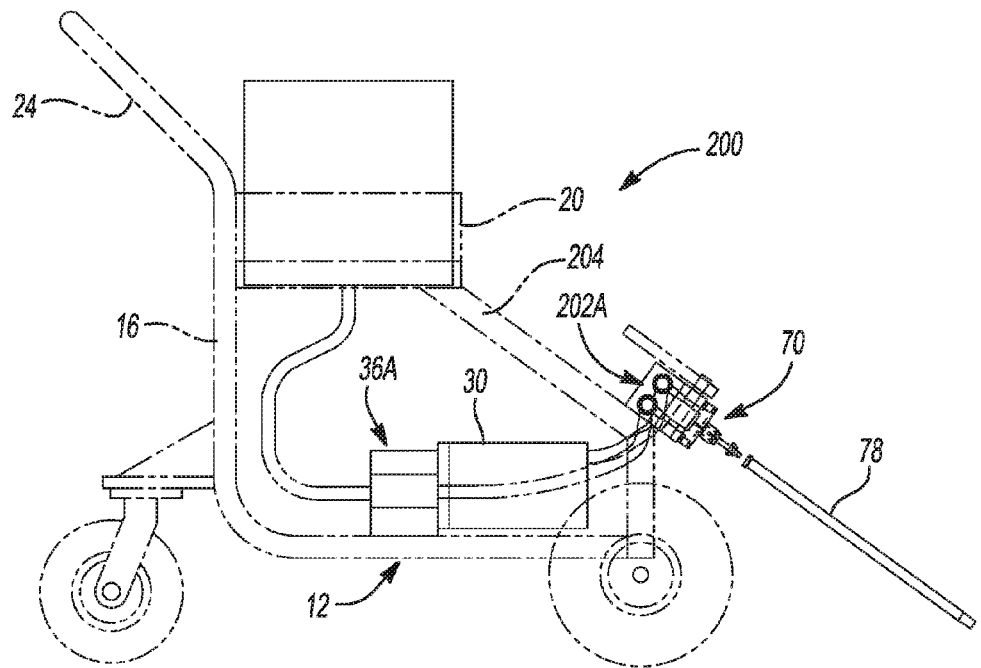
FIG. 9 is a side view of another embodiment of the device.

Turning to FIG. 9, an alternate embodiment of the device 10 is generally indicated by reference number 200. The device 200 is similar to the device 10 described in FIGS. 1-8, and therefore like components are indicated by like reference numbers. However, the device 200 includes at least one dual channel manifold 202. The dual channel manifold or adapter base plate 202 is located on a forward support member 204 of the carrier 12.

Figure 10:
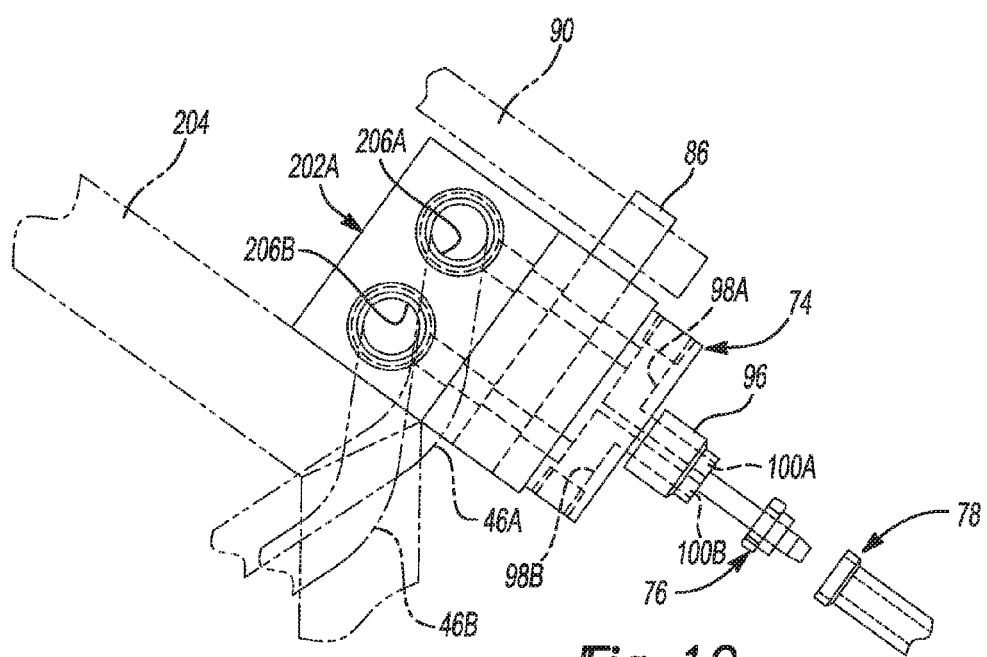
FIG. 10 is a side view of another manifold used with the device.

With reference to FIGS. 10-12, the dual channel manifold 202 includes a pair of inlet ports 206A located on opposite ends of the manifold 202 and a pair of inlet ports 206B located on opposite ends of the manifold. The inlet ports 206A communicate with a first bore 208A that extends along a length of the manifold 202. The inlet ports 206B communicate with a second bore 208B that extends along the length of the manifold 202 parallel to the first bore 208A. The manifold 202 includes side bores 210A that communicate with the first bore 208A and with outlets 212A located along the length of the manifold 202. Similarly, the manifold 202 includes side bores 210A that communicate with the first bore 208A and with outlets 212A located along the length of the manifold 202. One of the inlets 206A is connected with the hose 46A while the opposite inlet 206A is plugged. One of the inlets 206B is connected with the hose 46B while the opposite inlet 206B is plugged. The outlets 212A communicate directly with the inlets 80A of the rotary valves 76 and the outlets 212B communicate directly with the inlets 80B of the rotary valves 76. Accordingly, each applicator unit 70 is fed "A" and "B" side fluids separately directly from the manifold 202.

Figure 13:
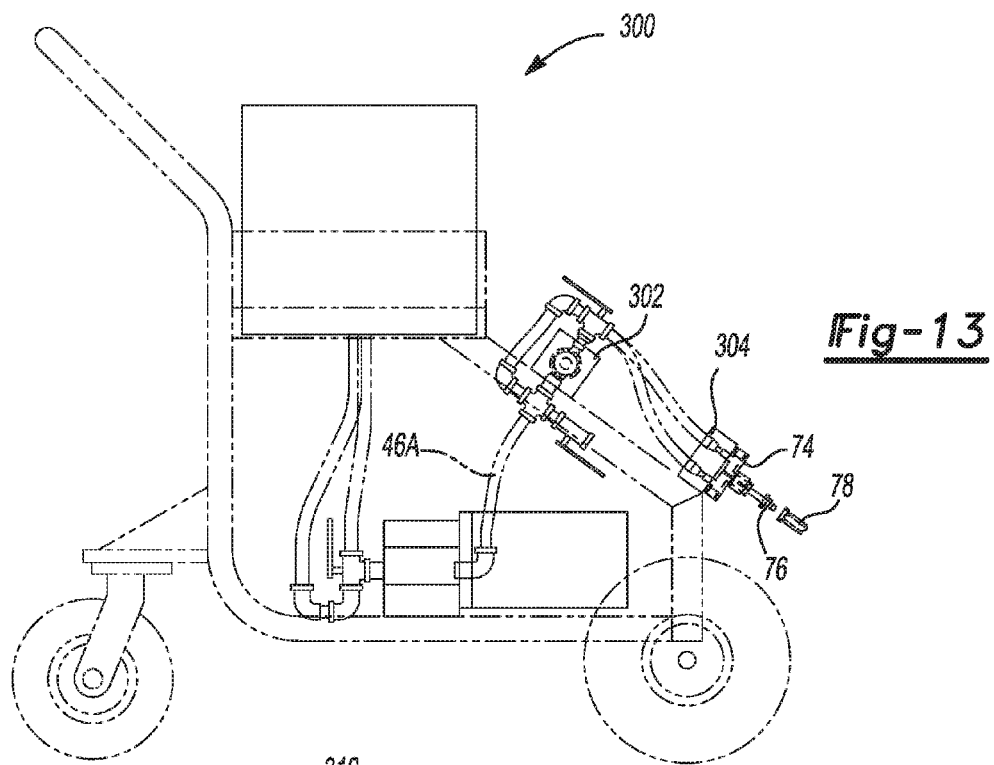
FIG. 13 is a side view of another embodiment of the device.
Figure 14:
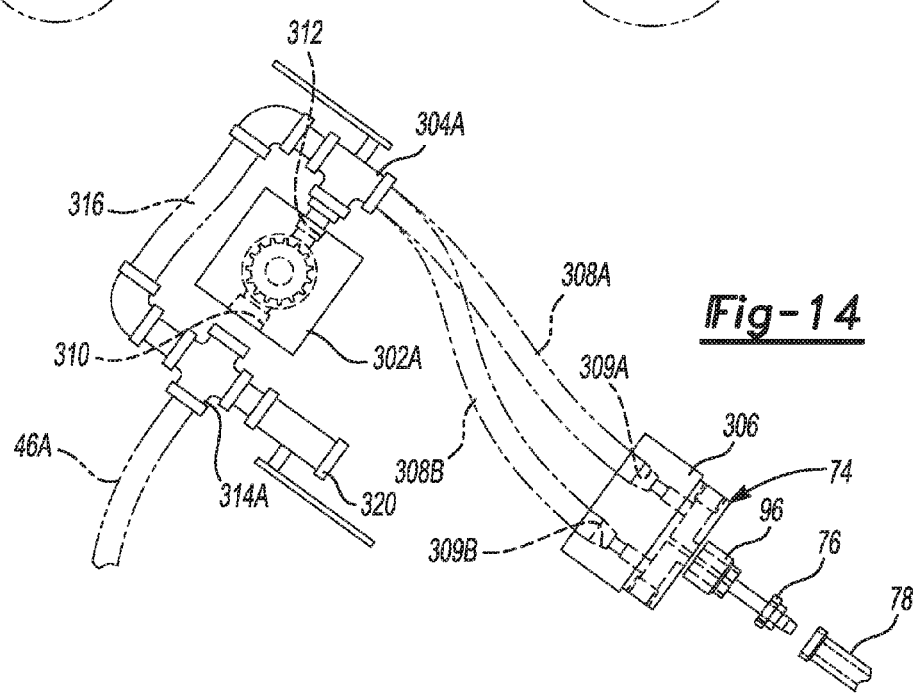
FIG. 14 is a side view of a portion of the device.
Figure 17:
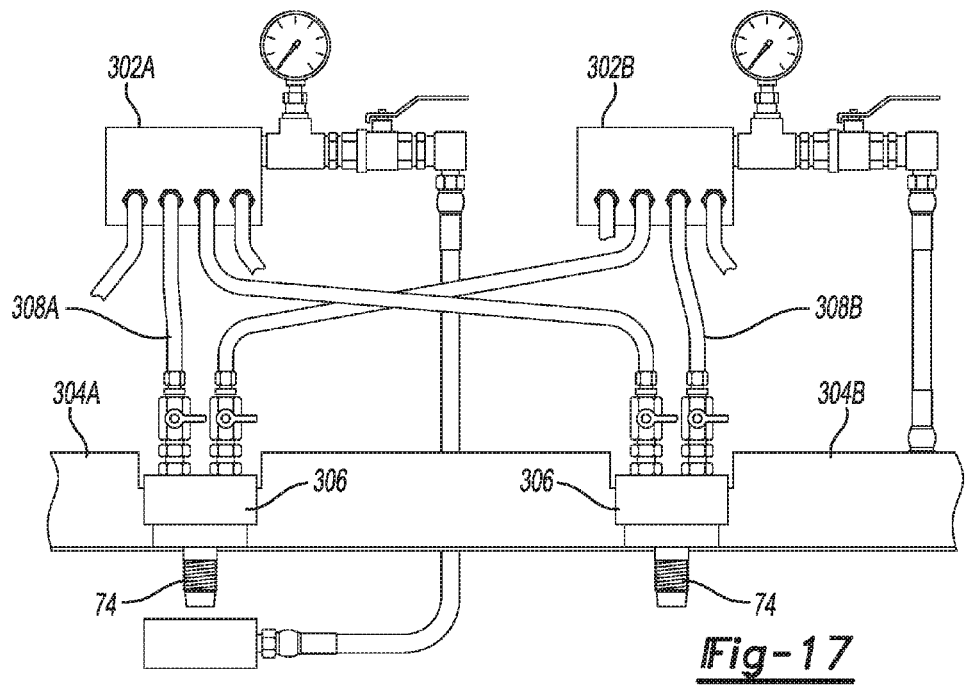
FIG. 17 is a view of a portion of the device.
Figure 18:
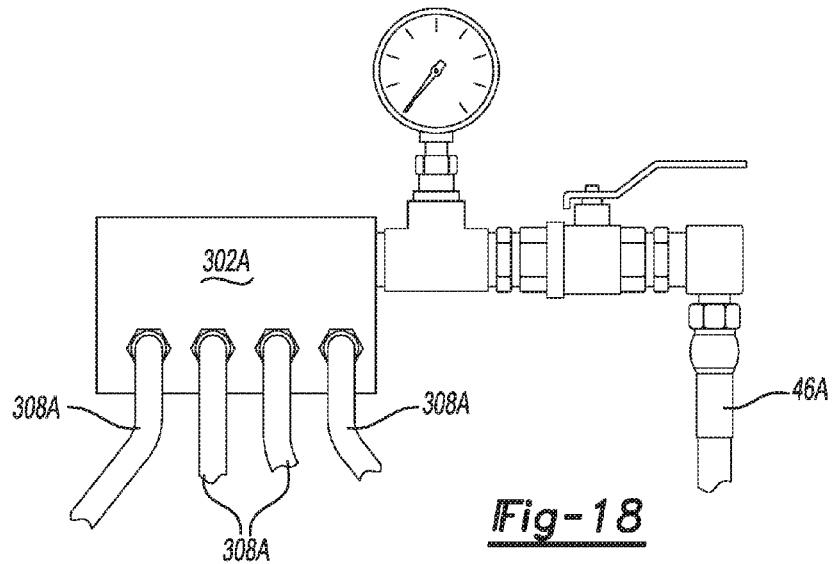
FIG. 18 is a view of another portion of the device.

Turning to FIG. 13, yet another alternate embodiment of the device 10 is generally indicated by reference number 300. The device 300 is similar to the device 10 described in FIGS. 1-8, and therefore like components are indicated by like reference numbers. However, the device 300 replaces the accumulators 50A and 50B with one or more flow dividers 302 and replaces the rotary valves 72 with a plurality of diverter valves 304A and 304B, and adds an adaptor plate 306 positioned between the plurality of diverter valves 304A and 304B and the plural component or dual manifolds 74. The present invention contemplates that in other embodiments of the invention additional flow dividers 302, diverter valves 304A, 304B and adaptor plates 306 than are illustrated in the Figures are utilized.

With reference to FIGS. 13-18, the flow dividers 302 include dividers 302A and 302B to receive "A" and "B" side fluids, respectively. Flow dividers 302A, 302B have a single input port 310 and a plurality of output ports 312. The number of output ports 312 depends on the number of diverter valves 304A, 304B and mixing nozzles 78 desired. The flow dividers 302A, 302B are connected to pumps 36A, 36B via lines 46A, 46B and four port couplings 314A and 314B. The flow dividers 302A, 302B uniformly divide flow of fluid from the input port 310 to the plurality of output ports 312. Thus, each of the output ports will have the same flow rate. Since each individual divider output port flow rate is uniform, if one output is blocked the others will also stop flow in response. The present invention contemplates that flow dividers 302A, 302B have different number and sized output ports.

The number of diverters 304A and 304B are matched to the number of output ports on flow dividers 302A and 302B. Diverters 304A and 304B are three way ball valves that may be actuated to completely shut of fluid flow to a particular nozzle 78. Diverters 304A and 304B receive fluid from the outlet ports 312 of the flow dividers 302A, 302B and communicate the fluid to the adaptor plates 306 via a plurality of feed lines 308A, 308B.

The adaptor plate 306 is connectable to the dual manifold 74 described in the previous embodiments. More specifically, adapter plate 306 includes two fluid passages or bores 309A, 309B for communicating fluid from feed lines 308A, 308B to each of the bores of dual manifold 74.

In an embodiment of the present invention, a fluid by pass 316 is provided to communicate fluid from the diverters 304A, 304B to inlet 310. The redirection or bypass of fluid flow through fluid by pass 316 from the inlet 310 of the divider to the outlet 312 of the divider keeps the fluid flow through the outlet ports of the divider all uniform when an individual nozzle does not have any or the same flow rate as the other nozzles.

The present embodiment further includes a two way ball valve 320 connected to the four way ball valve 314. Valve 320 allows fluid to be diverted to a hand held gun or similar bead dispenser (not shown). The bead dispenser may be connected to the end of a length of hose and the other end of the hose connected to the valve 320. A single bead dispensed through the gun allows the operator to apply an adhesive in congested areas where the dispensing cart simply will not fit.

Figures 19, 20:
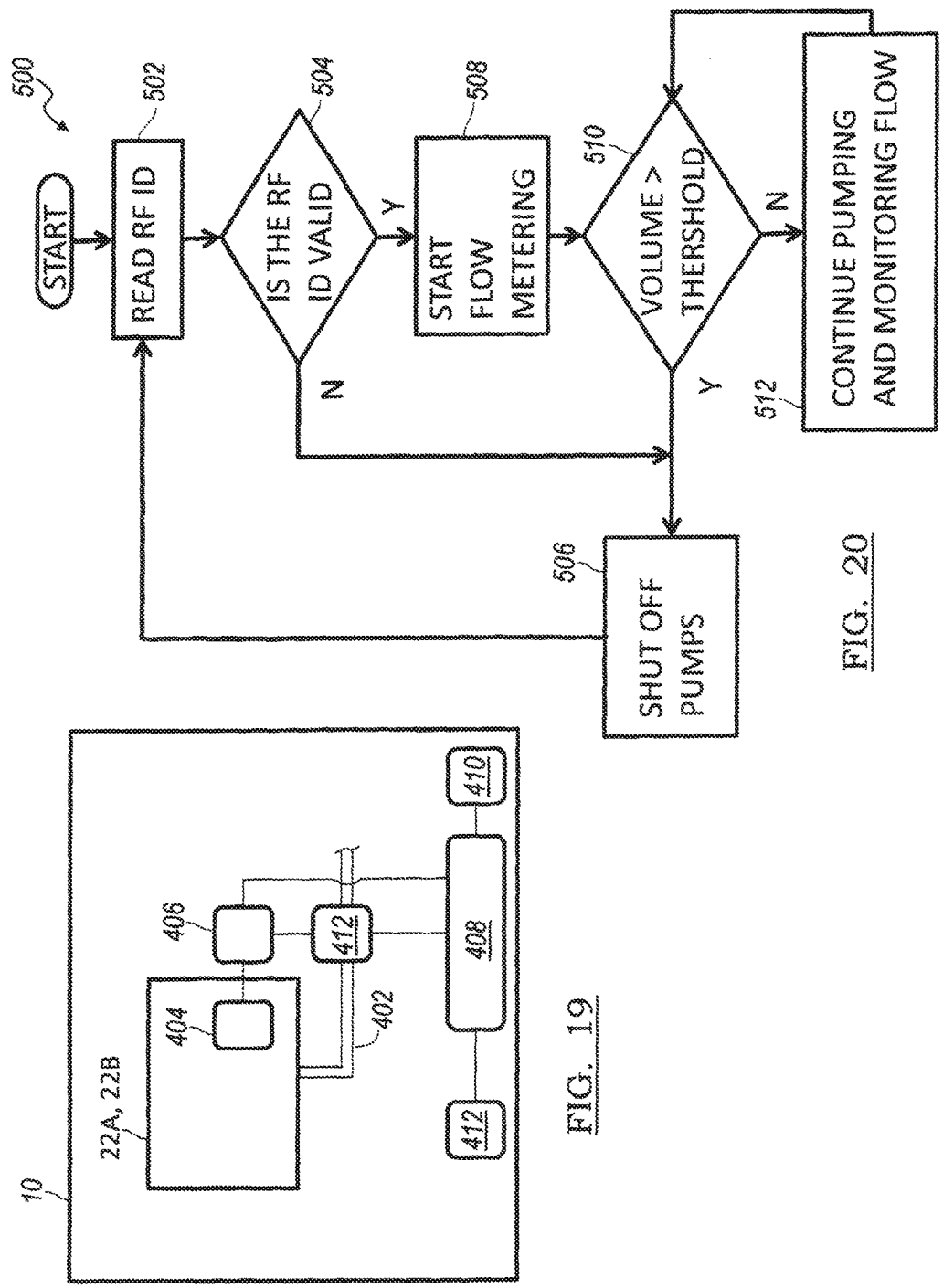
FIG. 19 is a schematic diagram of a control system used with the device.
FIG. 20 is a flow chart illustrating a method of controlling the device.

Preferably, the present embodiment includes a quick release mixing nozzle 78 for faster change-outs. The quick release mixer nozzle has restriction orifice 76 integrated into the nozzle. The mixer nozzle 78 is configured to be quickly releasable from dual manifold 74 by eliminating the threads and attaching the nozzle to the dual manifold 74 via a latch 330 or similar device, as shown in FIG. 19. Such a latch 330 is available from SouthCo of Concordville, Pa.

The quick release mixer nozzle is an improvement over the industry standard which is a threaded attachment of the mixing nozzle to the dual manifold 74. Threaded nozzles are not preferred since they can easily get gummed up with adhesive and require cleaning.

Turning now to FIG. 19, the device 10 is illustrated schematically with either the "A" side package 22A or the "B" side package 22B. An outlet line 402 is coupled to the package 22A, 22B through which the compound within the package 22A, 22B is drawn by the pump 36A, 36B. Each individual package 22A, 22B includes an identifier 404. The identifier 404 is used to uniquely identify the particular package 22A, 22B. The identifier 404 may be located in various locations, for example on an inside or outside of the package 22A, 22B, embedded within the package 22A, 22B, located within, or attached to, a bag within the package 22A, 22B, or within the adhesive compounds themselves. The device 10 includes a reader 406. The reader 406 communicates with the identifier 404 through various methods, as will be described below. The identifier 406 in turn is in electrical communication with a controller 408. The controller 408 is preferably an electronic control device having a preprogrammed digital computer or processor, control logic, memory used to store data, and at least one I/O peripheral. The control logic includes a plurality of logic routines for monitoring, manipulating, and generating data. The controller 408 electrically communicates with various components of the device 10, such as the prime mover 30 or any manual controls indicated generally by reference number 410, and is operable to convert manual or automatic inputs into electrical signals that control the device 10.

A flow metering device 412 is connected to the outlet line 402. The flow metering device 412 is operable to detect a flow of the compound from the package 22A, 22B. A signal is communicated to the controller 408 indicative of the flow of the compound.

The identifier 404 and the reader 406 may take various forms. For example, the identifier 404 may be a radio frequency identifier (RFID) having a signal unique to the package 22A, 22B and the reader 406 may be a radio frequency receiver operable to detect the RFID from the identifier 404.

Turning to FIG. 20 and with continued reference to FIG. 19, an exemplary method of using the RFID 404 and the receiver 406 is generally indicated by reference number 500. The method 500 begins at step 502 where the receiver 406 reads or detects the RFID 404. At step 504 the controller 408 analyzes the RFID signal and determines if the RFID signal is valid. A valid RFID signal may be one that is found in memory storage within the controller 408 (i.e. a previously stored value), one that conforms to an expected format (i.e. a certain number or digit length, etc., that is unique to the A side and B side packaging in order to prevent reversing the packaging on the device 10), and/or one that has not been previously recorded by the controller 408 and been blocked. If the detected RFID signal is not valid, the method proceeds to step 506 and the pumps 36A, 36B are shut off. This prevents incompatible compounds from being pumped through the device 10, such as compounds having low viscosities or inadvertently switching the A side with the B side. If the RFID signal is valid, the method proceeds to step 508 where the flow of the compound from the package 22A, 22B is monitored via the flow meter 412. At step 510 the controller 408 stores the RFID signal and associates the flow data with the RFID signal. The controller 408 then calculates a volume of compound that has flowed from the package 22A, 22B and compares this volume with a threshold. The threshold is equal to or greater than the expected volume of the compound within the package 22A, 22B. If the volume of compound is less than the threshold, the method proceeds to step 512 where the device 10 continues to allow pumping of the compound and monitors the flow of the compound and returns to step 510. If, however, the volume exceeds the threshold, the method proceeds to step 506 and the pumps 36A, 36B are automatically shut off. In addition, the controller 408 locks out the RFID signal such that it cannot be used again. A display device 412, such as a warning indicator or digital display screen connected to the controller 408, can indicate when the volume of the compound within the package 22A, 22B is running low, the estimated volume remaining, or any other associated information to a user of the device 10. By associating the RFID signal with the accumulated metered flow and storing these values in memory, a package 22A, 22B can be reused over time so long as the volume of the compound remains less than the threshold.

In one embodiment, the identifier 404 may be a unique bar code and the reader 406 may be a bar code scanner. The method of operating the device 10 would be the same as that described in FIG. 20. In another embodiment, the identifier 404 may be a unique number and the reader 406 may be a keypad. Again, the method of operating the device 10 would remain the same, however, the step 502 would include a user of the device 10 entering the unique identifier 404 into the keypad 406.

Figure 21:
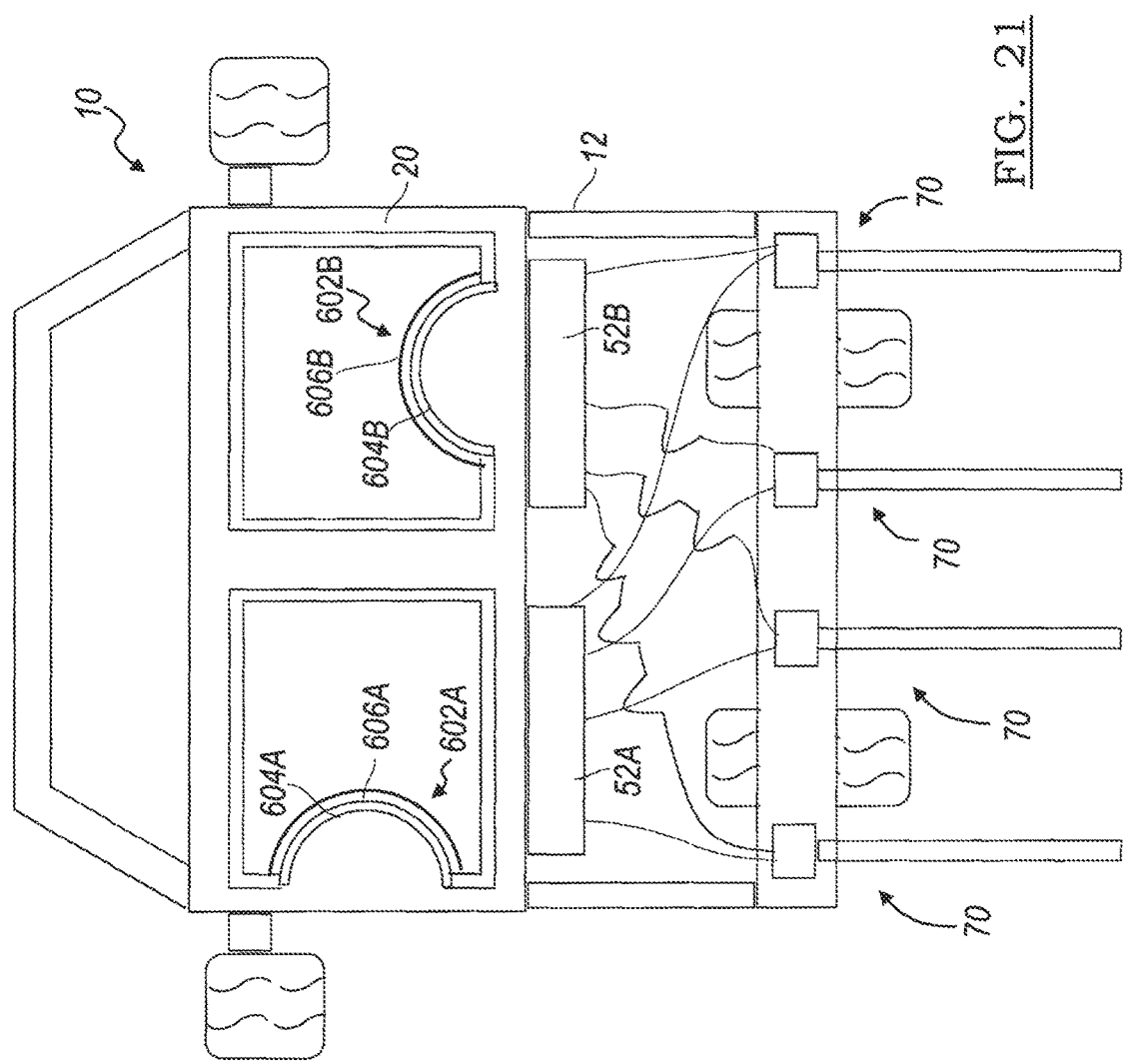
FIG. 21 is a schematic top view of an interlocking system used with the device.

Turning to FIG. 21, an embodiment of the device 10 is shown having interlock features 602A and 602B. It should be appreciated that the interlock features 602A, 602B are illustrated schematically in FIG. 21. Each interlock feature 602A, 602B includes a first interlock 604A, 604B and a second interlock 606A, 606B, respectively. The first interlocks 604A, 604B are disposed on the upper frame 20 of the carrier 12 that supports the packages 22A and 22B. Interlock 604A is disposed on the side of the upper frame 20 that supports the package 22A and the interlock 604B is disposed on the side of the upper frame 20 that supports the package 22B. The second interlocks 606A, 606B are disposed on the packages 22A and 22B, respectively. The interlock 606A is configured to only interlock or mate with the interlock 604A and the interlock 606B is configured to only interlock or mate with the interlock 604B. The interlocks 602A and 602B prevent the packages 22A and 22B from being connected to the device 10 on the wrong side, thereby preventing damage to the device 10.

The interlocks 602A and 602B may take various forms without departing from the scope of the present invention. For example, the interlock 604A may be a protrusion on a side of the upper frame 20 and the interlock 604B may be a protrusion on a front of the upper frame 20. Accordingly, the interlock 606A would be a recess sized to accommodate the protrusion interlock 604A and the interlock 606A would be located on a short or long side of the package 22A. The interlock 606B would be a recess sized to accommodate the protrusion interlock 604B and the interlock 606B would be located on whichever of the short or long side of the package 22B that does not correspond with the location of the interlock 606A on the package 22A. In another embodiment, the interlocks 604A and 606B may be on the same sides of the upper frame 20 but have different sizes or shapes. Accordingly, the interlocks 606A and 606B would be on the same sides but would have shapes corresponding to the interlocks 604A and 604B, respectively.

Figure 22:
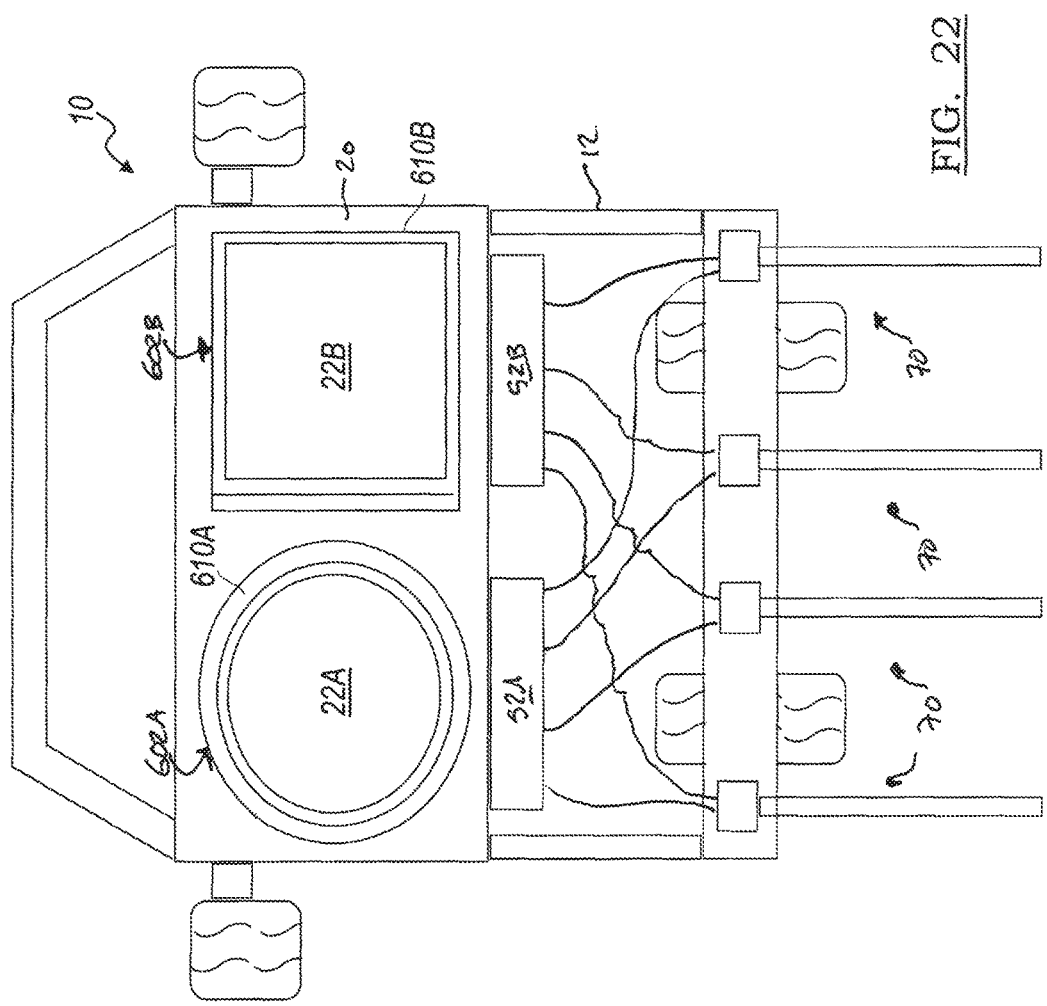
FIG. 22 is a top view of an embodiment of the interlocking system used with the device.

Another example of the interlocks 602A and 602B is shown in FIG. 22. The interlock 602A includes a round receiver 610A located in the upper frame 20 and the package 22A has a round cross-section configured to fit within the round receiver 610A. The interlock 602B includes a rectangular or square receiver 610B and the package 22B has a rectangular or square cross-section configured to fit within the rectangular or square receiver 610B.

Figure 23:
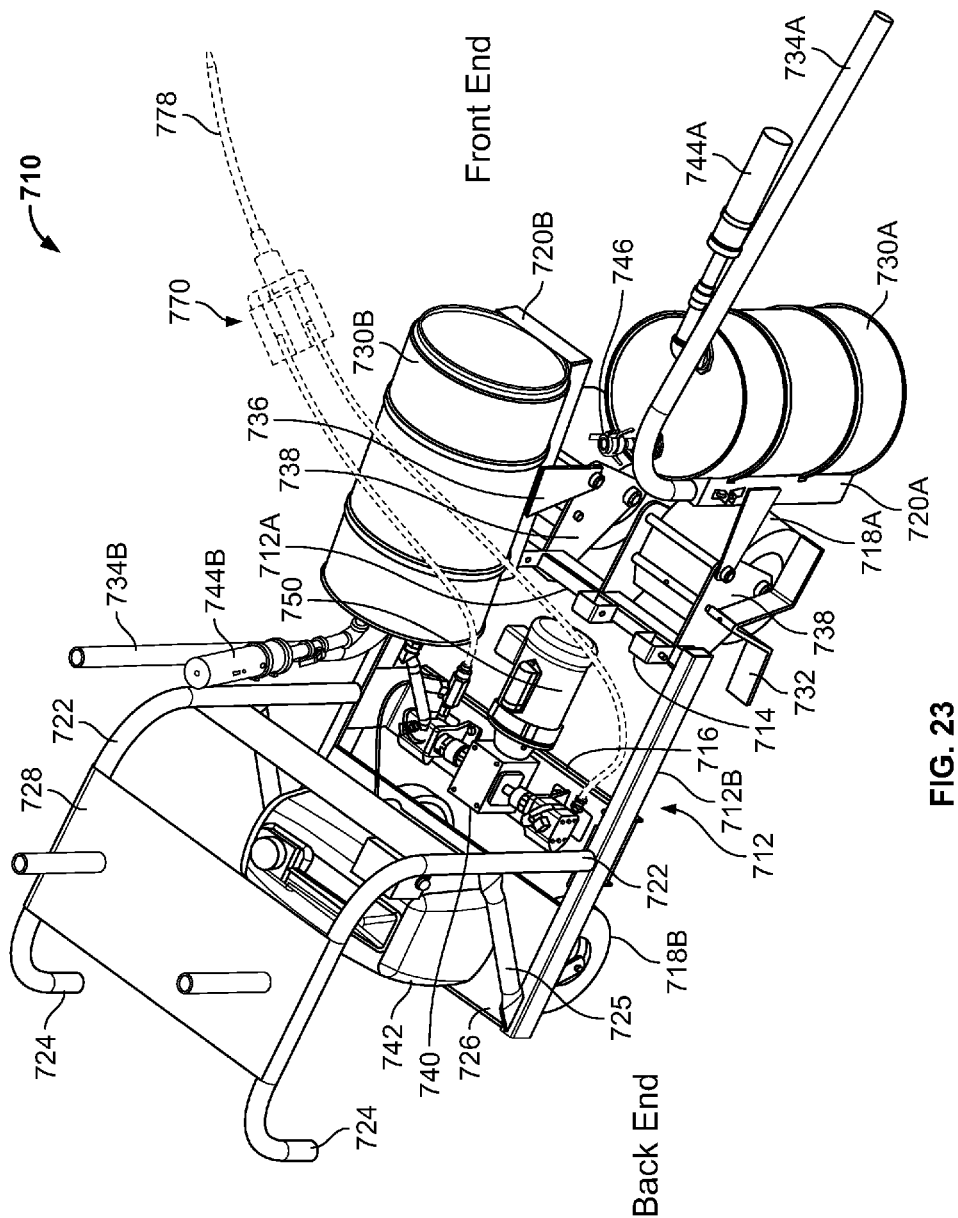
FIG. 23 is a perspective view of another embodiment of the device.

Turning to FIG. 23, another embodiment of the device 10 is generally indicated by reference numeral 710. The device 710 is similar to the device 10 described in FIGS. 1-8 and 13, and therefore like components are indicated by like reference numbers. However in this embodiment the device includes at least two trays for holding drums or containers that may be tilted, independent of each other, from a first position to a second position in order to facilitate the loading or unloading of the drums. In this embodiment, the at least two trays may each support a drum capable of holding at least 15 gallons of fluid. Generally, each drum can hold from about 15 gallons to about 25 gallons of fluid or adhesive component. The tilting feature of the trays will especially allow a user to lift only half the weight at a time during the loading and unloading of the drums containing the adhesive component. The device may also include at least two pair of wheels, a pair each on the front and the back of the device, such that the wheels generally help to evenly distribute the weight of the drums so that no individual wheel pressure exceeds the compressive strengths of various insulation boards or substrates, typically 20 PSI. While the back wheels may be pivotable, the front wheels that support the weight of the trays holding the drums may include a braking mechanism to immobilize the cart during loading and/or unloading of the drums.

Referring specifically to FIGS. 23-25 and 27, the device for applying a two-part fluid on a substrate is generally indicated by reference numeral 710. Typically the width of the device 710 will be about 31.9 inches or less from outer edge of one wheel to the outer edge of the opposing wheel that is located on the same axis and may aid in the maneuverability of the device on congested roof systems and allow the cart to fit through standard sized doorways.

Referring now to FIG. 23, the device 710 includes a carrier or frame 712 with a front end and a back end. The frame 712 support various components of the device 710 and may take several forms without departing from the scope of the present invention. In one embodiment, the frame 712 is shown as a rectangular base with short portions 712A and longer portions 712B (shown also in FIG. 27). The frame 712 is designed to support one or more vertical posts 714, at least two L-shaped columns 722 that extend from the frame 712 on either side of the device 710, and arms 725 disposed at an oblique angle from the vertical portion of the L-shaped columns 722. Arms 725 that extend between the frame 712b and L-shaped columns 722 offer stability to the columns 722.

The vertical posts 714 may be disposed on the shorter portions of the frame 712A and may include a top surface and a bottom surface. While the bottom surface of the posts 714 are fixed to the frame 712A, the top surface contacts the tray 720 when the tray is in a horizontal (loaded) position (as shown in FIG. 1) and may be padded to help support the load on the tray when the tray is held in the horizontal position. The L-shaped columns 722 that extend from the frame 712 may have a proximal fixed end attached to the frame 712B and a free distal end that may include an ergonomically shaped handle 724.

Figure 24:
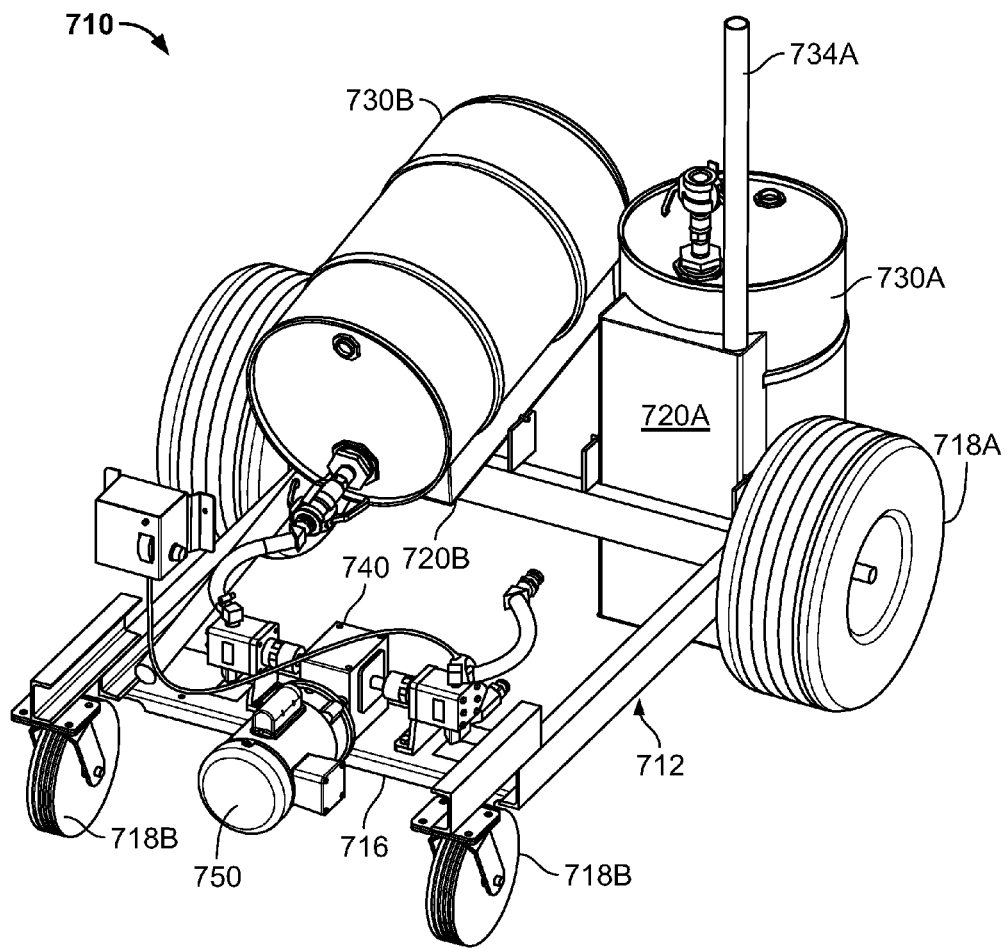
FIG. 24 is a perspective view of yet another embodiment of the device.
Figure 25:
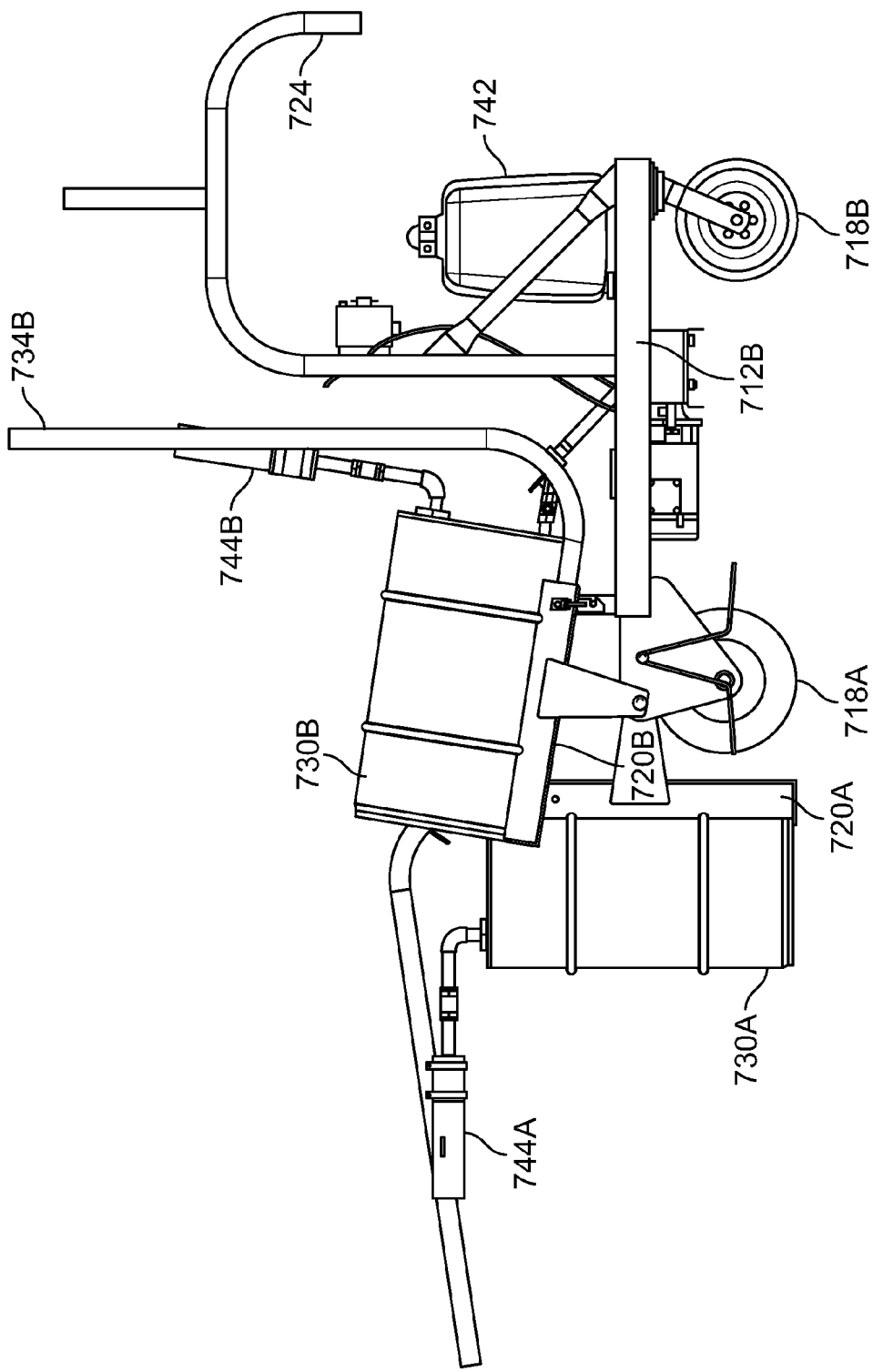
FIG. 25 is a side-view of the device shown in FIG. 23.
Figure 27:
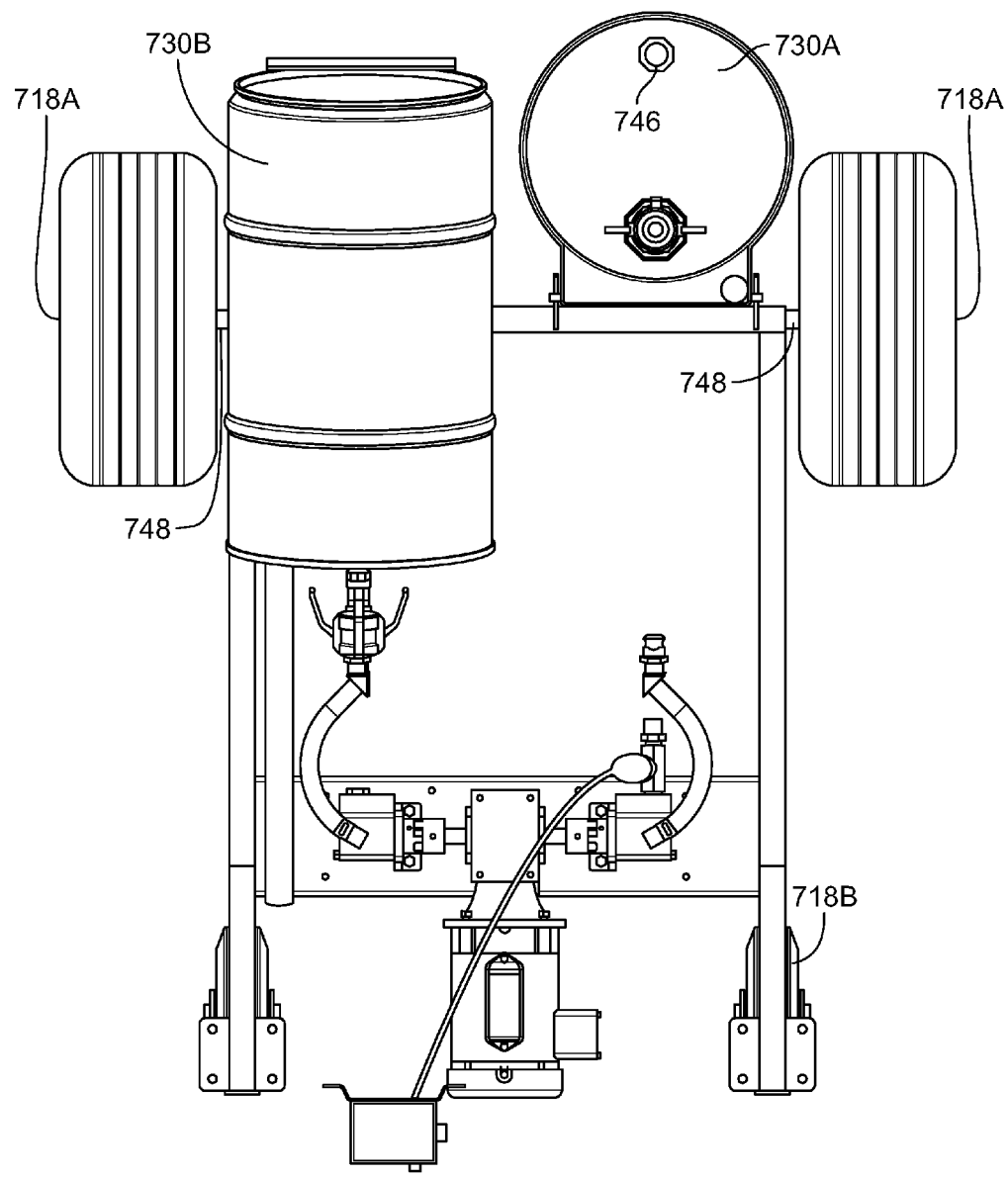
FIG. 27 is a top view of the device in FIG. 23 showing the extensions of the carrier or frame.

The frame 712 may also include at least two pair of wheels 718A and 718B disposed in the front and back of the device 710. The front wheels 718A (on the drum side) may be positioned below the trays 720 A, B that hold the drums 730A and 730B. The wheels 718A may be attached to the frame 12 via a standard axle 748 (shown in FIG. 27) and may be suitably positioned, such as but not limited to just outside the frame 712 as shown in FIGS. 24 and 27. It will be appreciated by a person skilled in the art that the front wheels 718A may also be positioned in any suitable location such as outside or inside the frame 712 of the device 710 so that there is uniform distribution of the load. For example, in one embodiment the wheels 718A may also be coupled to the short portions 712A of the frame 712 as shown in FIG. 23. These front wheels may include a pair or two pair of wheels and may be of the same dimension as the back wheels 718B. In one embodiment the front wheels 718A may be larger than the back wheels 718B as shown in FIG. 24 so that they provide the necessary support and stability to the trays 720 A, B which hold the 15-gallon drums 730A (first drum) and 730B (second drum). The front wheels 718A may also include any art known braking mechanism 732, such as but not limited to a dead man's switch that can be controlled by an operator. This switch particularly helps to keep the device 710 immobilized while the drums 730 A,B are loaded and/or unloaded independently of each other. The back wheels 718B may be fixed to a part of the frame 712B that is more proximate to the L-shaped column 722. The back wheels may be pivotable and rotatable allowing the device 710 to move forward as well as turn and rotate especially in confined spaces. The wheels 718A and 718B on the device may be of any type including but not limited to pneumatic, hard cast, flat free tire, etc. The device 710 may have a total of six wheels with four wheels disposed in the front of the device and two disposed in the back of the device thus ensuring that the pressure exerted by all the wheels do not exceed the compression strength of the insulation board.

Figure 26:
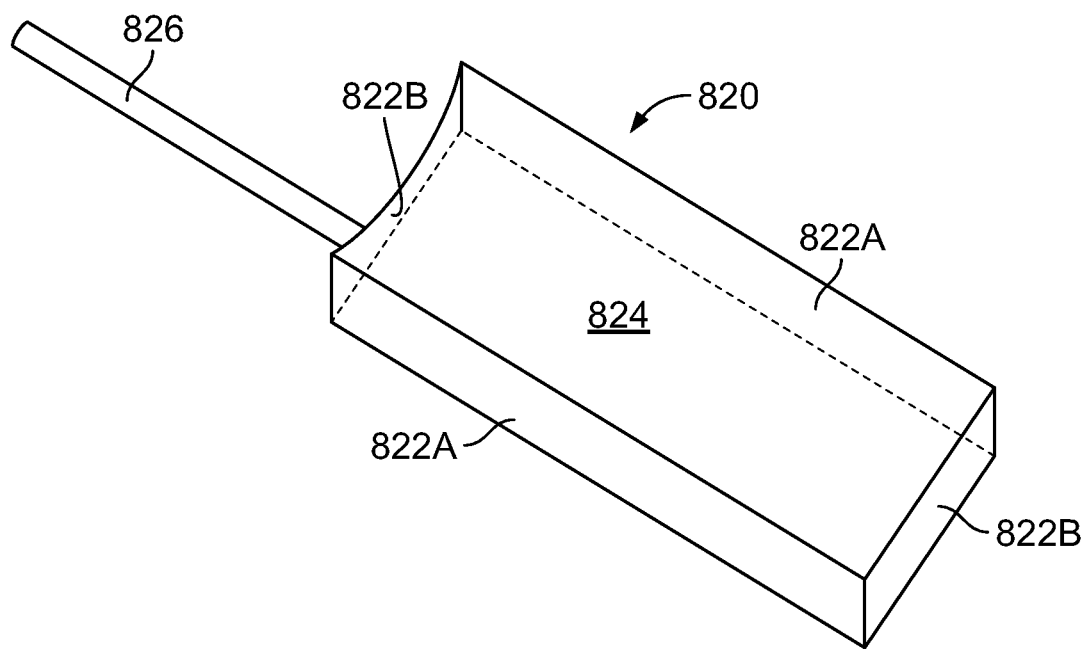
FIG. 26 is a view of the portion of the device in FIG. 23 showing a tray.

The trays 720 A, B may be of any shape and size that is suitable to hold the container or drums 730 A,B of about 15 gallons capacity. As shown in FIG. 26 a tray 820 may include two pairs of side walls 822A and 822B with a base or bottom wall 824 extending between the side walls. A single handle (826 in FIG. 26 or 734 in FIGS. 23-25) may be attached to one of the sidewall 822B of the tray to assist an operator to tilt the tray 820. The sidewall 822B that is opposite to the handle may include any type of assists such as but not limited to gas struts or springs (not shown) to help safely lower the drums from the load (vertical) position to the dispense (horizontal) position and more importantly prevent the potential for injuries from strains, pinch points, etc. The tiltability of the tray 720 is achieved via a hinge mechanism enabled by an angularly movable structure 736 attached to an extension 738 affixed directly to the short portion 712A of the frame. The hinge mechanism allows each individual tray 720A or 720B to exist in two different positions. The trays 720A and 720B can each exist either in a horizontal or dispense position or in a unload or vertical position as shown in FIGS. 23 and 24. This tilting feature of the trays 720A and 720B, independent of each other, allows an operator to load or unload a single drum at a time thus allowing an operator to lift only half of the weight at a time. A handle 734 disposed on the sidewall of both trays 720A or 720B (shown in FIG. 27) helps an operator to tilt a single tray at a time. Although the handle 734 is shown as straight in FIG. 24 or J-shaped in FIG. 23, it will be appreciated by one skilled in the art that the handle 734 may exist in any suitable shape. In one embodiment the handle 734 may each include any art known locking means disposed at the free distal end to further secure the tray held in a horizontal position.

The frame 712 may further include one or more shelfs 716 and 726 that extend between the longer portions of the frame 712B. While shelf 716 may be used to hold the pumping system 740 that draws the adhesive components from the drums 730A and 730B and delivers the mixed adhesive on to the substrate, shelf 726 may be used to hold a generator 742 that can power the pumping system 740. A separate shelf 728 that extends between the L-shaped columns 722 may also be used to hold any associated tool or tool kit or hose.

The drums 730A and 730B that rest on the trays 720A and 720B may typically include a top surface and a bottom surface. A first opening for a detachable dessicator 744A or 744B that prevent moisture or dust from entering the drums and help equalize the pressure within the drums may be disposed on the top surface of the drum. Further, a second capped opening 746 may also be disposed on the top surface of the drums 730A and 730B and may be used to fill either a first or second part of the adhesive component. When the drums 730A or 730B are loaded on the trays 720A or 720B they may be secured by any art known means, such as but not limited to, metal or plastic straps (not shown). The pumping system 740 and the dispensing applicator 770 (shown in FIG. 23) on the device 720 have the same components as described for device in FIGS. 1-9.

The description of the invention is merely exemplary in nature and variations that do not depart from the gist of the invention are intended to be within the scope of the invention. Such variations are not to be regarded as a departure from the spirit and scope of the invention.

The invention claimed is:

1. A system for applying a two-part adhesive to a substrate, the system comprising:
   a frame with a front end and a back end;
   two pairs of wheels, where each pair is rotationally coupled to the front end and the back end of the frame;
   a first tray for holding a first drum to store a first compound, the first drum having an outlet in communication with the first compound and a handle;
   a second tray for holding a second drum to store a second compound, the second drum having an outlet in communication with the second compound and a handle;
   a first hinge comprising a first angularly movable structure and a first frame extension, the first frame extension attached to the front end of the frame and the first angularly movable structure, respectively, and the first angularly movable structure hingedly attached to the first tray;
   a second hinge comprising a second angularly movable structure and a second frame extension, the second frame extension attached to the front end of the frame and the second angularly movable structure, respectively, and the second angularly movable structure hingedly attached to the second tray; wherein the first and the second trays can tilt independent of each other;
   a prime mover mounted on the frame and connected to a gear box through a rotatable shaft, wherein the gear box transfers a driving torque from the prime mover to a first rotatable shaft coupled to a first pump and a second rotatable shaft coupled to a second pump; wherein the gear box and the first and second rotatable shaft do not come in contact with the first and the second compound;
   the first pump having an inlet in communication with the outlet of the first drum and having an outlet, the first pump mounted on the frame and driven by the prime mover to draw the first compound from the first drum and pump through the outlet of the first pump;
   the second pump having an inlet in communication with the outlet of the second drum and having an outlet, the second pump mounted on the frame and driven by the prime mover to draw the second compound from the second drum and pump through the outlet of the second pump;
   an applicator having a first inlet, a second inlet, and an outlet, wherein the first inlet of the applicator is in communication with the outlet of the first pump and the second inlet of the applicator is in communication with the outlet of the second pump, wherein the applicator is configured to mix the first compound with the second compound to form the two-part adhesive.

2. The system of claim 1, wherein the pair of wheels disposed at the front end of the frame have a different dimension compared to the pair of wheels at the back end of the frame.

3. The system of claim 1, wherein the first drum on the first tray and the second drum on the second tray each has about 15 to 25 gallon capacity.

4. The system of claim 1, wherein the first tray and the second tray can be tilted to a vertical loading position or a horizontal dispensing position.

5. The system of claim 1, further comprising a first shelf to hold the pumping system and a second shelf to hold a generator.

6. The system of claim 1, wherein the first compound and the second compound have average viscosities between about 2500 Pas and about 7000 Pas.

7. The system of claim 1 further comprising a radio frequency identifier disposed on the first tray and a radio frequency receiver interconnected to the prime mover, wherein the radio frequency receiver communicates with the radio frequency identifier to validate the first tray.

8. The system of claim 1 wherein the first pump and the second pump are integrated into a dual pump assembly.

9. The system of claim 1, further comprising a first manifold mounted on the frame and having an inlet in communication with the outlet of the first pump and having a plurality of outlets, and a second manifold mounted on the frame and having an inlet in communication with the outlet of the second pump and having plurality of outlets.

10. The system of claim 9, wherein the first manifold and the second manifold are formed as a single, dual channel manifold.

11. The system of claim 1, wherein the applicator includes a dual manifold, an orifice restrictor attached to the dual manifold, and a mixing wand attached to the orifice restrictor.

12. The system of claim 11, wherein the dual manifold includes the first inlet and the second inlet of the applicator and includes a first outlet in communication with the orifice restrictor, a second outlet in communication with the orifice restrictor, and a tab member disposed between the first and second outlets, and wherein the orifice restrictor includes a first orifice in communication with the first outlet of the dual manifold, a second orifice in communication with the second outlet of the dual manifold, and a slot that receives the tab member.

13. The system of claim 12, wherein the first orifice has a diameter different than a diameter of the second orifice.

14. The system of claim 13, wherein the diameter of the first orifice is a function of the material characteristics of the first compound and the diameter of the second orifice is a function of the material characteristics of the second compound.

15. The system of claim 11, wherein the mixing wand is connected to the orifice restrictor and has at a distal end the outlet of the applicator.

16. The system of claim 11, further comprising a rotary valve disposed between the dual manifold of the applicator and a first manifold mounted on the frame having an inlet in communication with the outlet of the first pump and a plurality of outlets and a second manifold mounted on the frame having an inlet in communication with the outlet of the second pump and having plurality of outlets, the rotary valve configured to control a flow of the first compound and the second compound from the first manifold and the second manifold, respectively, to the dual manifold of the applicator.

17. The system of claim 9, further comprising a first ball valve disposed between the first manifold and the first pump and a second ball valve disposed between the second manifold and the second pump.

* * * * *